(12) United States Patent
Zhu et al.

(10) Patent No.: US 9,408,167 B2
(45) Date of Patent: Aug. 2, 2016

(54) TRANSMITTING A SYNCHRONIZATION INDICATION

(71) Applicant: BLACKBERRY LIMITED, Waterloo (CA)

(72) Inventors: Yajun Zhu, Beijing (CN); Zhijun Cai, Herdon, VA (US); Hua Xu, Ottawa (CA); Shiwei Gao, Nepean (CA)

(73) Assignee: BlackBerry Limited, Waterloo, Ontario (CA)

( * ) Notice: Subject to any disclaimer, the term of this patent is extended or adjusted under 35 U.S.C. 154(b) by 165 days.

(21) Appl. No.: 14/002,371

(22) PCT Filed: May 3, 2013

(86) PCT No.: PCT/CN2013/075125
§ 371 (c)(1),
(2) Date: Aug. 30, 2013

(87) PCT Pub. No.: WO2014/176781
PCT Pub. Date: Nov. 6, 2014

(65) Prior Publication Data
US 2015/0215879 A1    Jul. 30, 2015

(51) Int. Cl.
*H04W 56/00*    (2009.01)

(52) U.S. Cl.
CPC ........ *H04W 56/001* (2013.01); *H04W 56/0015* (2013.01)

(58) Field of Classification Search
CPC ..... H04W 56/00; H04W 64/00; H04W 74/00; H04L 5/00; H04L 1/00; H04B 7/00
See application file for complete search history.

(56) References Cited

U.S. PATENT DOCUMENTS

| | | | | |
|---|---|---|---|---|
| 4,677,614 A * | 6/1987 | Circo | ................... | H04J 3/0641 370/222 |
| 2003/0210713 A1* | 11/2003 | Abdel-Ghaffar | ..... | H04B 7/2687 370/503 |
| 2008/0144669 A1* | 6/2008 | Lee | ................... | G06F 17/30575 370/503 |
| 2008/0267146 A1 | 10/2008 | Lewis | | |
| 2009/0097452 A1* | 4/2009 | Gogic | ................... | H04B 7/269 370/331 |
| 2009/0285143 A1* | 11/2009 | Kwun | ............... | H04W 52/0229 370/311 |
| 2010/0046494 A1* | 2/2010 | Palanki | ............. | H04W 56/0015 370/344 |
| 2010/0054237 A1* | 3/2010 | Han | ...................... | H04J 3/0638 370/350 |
| 2010/0157906 A1* | 6/2010 | Yang | ................... | H04W 56/001 370/328 |

(Continued)

FOREIGN PATENT DOCUMENTS

| CN | 102014405 | 4/2011 |
|---|---|---|
| CN | 102014479 | 4/2011 |

OTHER PUBLICATIONS

3GPP TS 33.401 V8.4.0, Technical Specification, 3rd Generation Partnership Project; Technical Specification Group Services and System Aspects; 3GPP System Architecture Evolution (SAE): Security architecture; (Release 8), Jun. 2009 (95 pages).

(Continued)

*Primary Examiner* — Andrew Chriss
*Assistant Examiner* — Rasha Fayed
(74) *Attorney, Agent, or Firm* — Trop Pruner & Hu, P.C.

(57) ABSTRACT

A first wireless access network node sets a synchronization indication based on whether the first wireless access network node is synchronized with a synchronization source. The first wireless access network node transmits the synchronization indication.

28 Claims, 8 Drawing Sheets

(56) References Cited

U.S. PATENT DOCUMENTS

| | | | |
|---|---|---|---|
| 2010/0182950 A1 | 7/2010 | Sexton | |
| 2011/0310878 A1 | 12/2011 | Lindoff | |
| 2012/0002564 A1 | 1/2012 | Sexton | |
| 2012/0044928 A1* | 2/2012 | Bhattad | H04J 11/0083 370/350 |
| 2012/0134455 A1* | 5/2012 | Wang | H04W 56/0015 375/354 |
| 2012/0224533 A1* | 9/2012 | Lin | H04W 56/002 370/328 |
| 2012/0236977 A1* | 9/2012 | Zou | H04W 56/0015 375/354 |
| 2013/0039331 A1* | 2/2013 | Koorapaty | H04L 5/001 370/330 |
| 2014/0056243 A1* | 2/2014 | Pelletier | H04W 74/04 370/329 |

OTHER PUBLICATIONS

3GPP TR 33.821 V8.0.0, Technical Report, 3rd Generation Partnership Project; Technical Specification Group Services and System Aspects; Rationale and track of security decisions in Long Term Evolved (LTE) RAN / 3GPP System Architecture Evolution (SAE) (Release 8), Mar. 2009 (137 pages).

3GPP TS 36.300 V10.3.0, Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), Mar. 2011 (197 pages).

3GPP TS 36.331 V11.0.0, Technical Specification, 3rd Generation Partnership Project; Technical Specification Group Radio Access Network; Evolved Universal Terrestrial Radio Access (E-UTRA); Radio Resource Control (RRC); Protocol specification (Release 11), Jun. 2012 (302 pages).

3GPP TS 36.413 V11.1.0, Technical Specification, 3rd Generation Partnership Project; Technical Specification Group Radio Access Network; Evolved Universal Terrestrial Radio Access Network (E-UTRAN); S1 Application Protocol (S1AP) (Release 11), Sep. 2012 (262 pages).

3GPP TS 36.423 V11.2.0, Technical Specification, 3rd Generation Partnership Project; Technical Specification Group Radio Access Network; Evolved Universal Terrestrial Radio Access Network (E-UTRAN); X2 application protocol (X2AP) (Release 11), Sep. 2012 (136 pages).

3GPP TR 36.806 V9.0.0, Technical Report, 3rd Generation Partnership Project; Technical Specification Group Radio Access Network; Evolved Universal Terrestrial Radio Access (E-UTRA); Relay architectures for E-UTRA (LTE-Advanced) (Release 9), Mar. 2010 (34 pages).

3GPP TR 36.839 V11.1.0, Technical Report, 3rd Generation Partnership Project; Technical Specification Group Radio Access Network; Evolved Universal Terrestrial Radio Access (E-UTRA); Mobility enhancements in heterogeneous networks (Release 11), Dec. 2012 (53 pages).

3GPP TR 36.912 V11.0.0, Technical Report, 3rd Generation Partnership Project; Technical Specification Group Radio Access Network; Feasibility study for Further Advancements for E-UTRA (LTE-Advanced) (Release 11), Sep. 2012 (62 pages).

Han et al., Capacity Analysis of Generalized Distributed Wireless Communication System and Transmit Antenna Selection for Maximization of Average Capacity, IEEE 2004 (5 pages).

Shan-Yuan Hol, Data Fusion in a Relay Network, SIT 2008, Toronto, Canada, Jul. 6-11, 2008 (5 pages).

Vasken Genc et al., IEEE 802.16J Relay-Based Wireless Access Networks: An Overview, Oct. 2008 (8 pages).

Kerpez et al., IEEE Transactions on Vehicular Technology, vol. 45, No. 2, 265—A Radio Access System with Distributed Antennas, May 1996 (11 pages).

David Soldani et al., Radio Communications Series, Nokia Siemens Networks, Wireless Relays for Broadband Access, Mar. 2008 (9 pages).

[Draft] 3GPP TR 36.392 V0.1.0 Technical Report 3rd Generation Partnership Project; Technical Specification Group Radio Access Network; Scenarios and Requirements for Small Cell Enhancement for E-UTRA and E-UTRAN; (Release 12) (Oct. 2012) (12 pages).

International Searching Authority, China, International Search Report and Written Opinion for PCT/CN2013/075125 dated Feb. 20, 2014 (11 pages).

Shiwei Gao et al., U.S. Appl. No. 13/745,051 entitled Communicating Data Using a Local Wireless Access Network Node filed Jan. 18, 2013 (99 pages).

Yufei Wu et al., U.S. Appl. No. 13/789,931 entitled Sending Data Rate Information to a Wireless Access Network Node filed Mar. 8, 2013 (42 pages).

Yufei Wu et al., U.S. Appl. No. 13/837,819 entitled Establishing Multiple Connections Between a User Equipment and Wireless Access Network Nodes filed Mar. 15, 2013 (55 pages).

3GPP TS 36.211 V11.2.0; Technical Specification; 3rd Generation Partnership Project; Technical Specification Group Radio Access Network; Evolved Universal Terrestrial Radio Access (E-UTRA); Physical Channels and Modulation (Release 11) (Feb. 2013) (109 pages).

3GPP TS 36.212 V11.2.0 Technical Specification; 3rd Generation Partnership Project; Technical Specification Group Radio Access Network; Evolved Universal Terrestrial Radio Access (E-UTRA); Multiplexing and channel coding (Release 11) (Feb. 2013) (82 pages).

3GPP TS 36.213 V11.2.0 Technical Specification; 3rd Generation Partnership Project; Technical Specification Group Radio Access Network; Evolved Universal Terrestrial Radio Access (E-UTRA); Physical layer procedures (Release 11) (Feb. 2013) (173 pages).

State Intellectual Property Office of the P.R. China (IPEA/CN), International Preliminary Report on Patentability for PCT/CN2013/075125 dated Sep. 6, 2015 (15 pages).

* cited by examiner

US 9,408,167 B2

TRANSMITTING A SYNCHRONIZATION INDICATION

BACKGROUND

As the number of wireless user equipments (UEs) has increased, wireless access service providers are increasingly facing challenges in meeting capacity demands in regions where the density of users is relatively high. To address capacity issues, the deployment of small cells has been introduced and studied. A small cell has a coverage area that is smaller than that of a larger cell, referred to as a macro cell.

If small cells are deployed, then communications with UEs can be offloaded from the macro cell to the small cells. In this way, data communication capacity is increased to better meet data communication demands in regions of relatively high densities of UEs.

SUMMARY

In general, according to some implementations, a first wireless access network node sets a synchronization indication based on whether the first wireless access network node is synchronized with a synchronization source. The first wireless access network node transmits the synchronization indication.

Other or alternative features will be apparent from the following description, from the drawings, and from the claims.

BRIEF DESCRIPTION OF THE DRAWINGS

Some embodiments are described with respect to the following figures.

DETAILED DESCRIPTION

Small cells can be deployed in various example environments, including both outdoor and indoor environments. A small cell corresponds to a coverage area that is provided by a small cell wireless access network node. The coverage area of a small cell is generally smaller than the coverage area of a larger cell, also referred to as a macro cell. The coverage area of a macro cell is provided by a macro wireless access network node.

Examples of small cells include femto cells, pico cells, micro cells, or any other cell that provides a coverage area that is smaller than that provided by a macro cell. Small cells can be used in stadiums, shopping malls, homes, campuses of businesses, educational organizations, or government agencies, or other locations where it is desirable to provide a relatively large number of cells within a geographic area.

In some examples, small cells can operate within the coverage areas of macro cells. In other examples, small cells do not operate within coverage areas of macro cells.

For more efficient operation of small cells, clusters of the small cells can be formed, where a cluster includes a group of small cells that coordinate their transmissions. The coordination of transmissions by small cells within a cluster can help to reduce interference among small cells, for example.

To form a cluster of small cells, synchronization is performed between small cells. Achieving synchronization between small cells can be challenging, particularly if there are a relatively large number of small cells in a network deployment. Deploying a dense arrangement of small cells can involve substantial effort on the part of a network operator relating to cell planning and configuration of the small cells.

In accordance with some implementations, automated coordination among small cells is provided to allow for more efficient formation and maintenance of clusters of small cells. The coordination that is performed among small cells includes synchronizing the small cells. Techniques or mechanisms according to some implementations are provided to allow a small cell to join a cluster of cells. More generally, techniques or mechanisms are provided to allow for maintaining the membership of a cluster of small cells.

In the ensuing discussion, reference is made to synchronizing small cells in the context of forming or maintaining membership of a cluster of small cells. In alternative implementations, synchronization of cells can be performed in other contexts. Moreover, although reference is made to small cells and macro cells in the present discussion, it is noted that techniques or mechanisms according to some implementations can be also applied to other types of cells.

Figure 1:
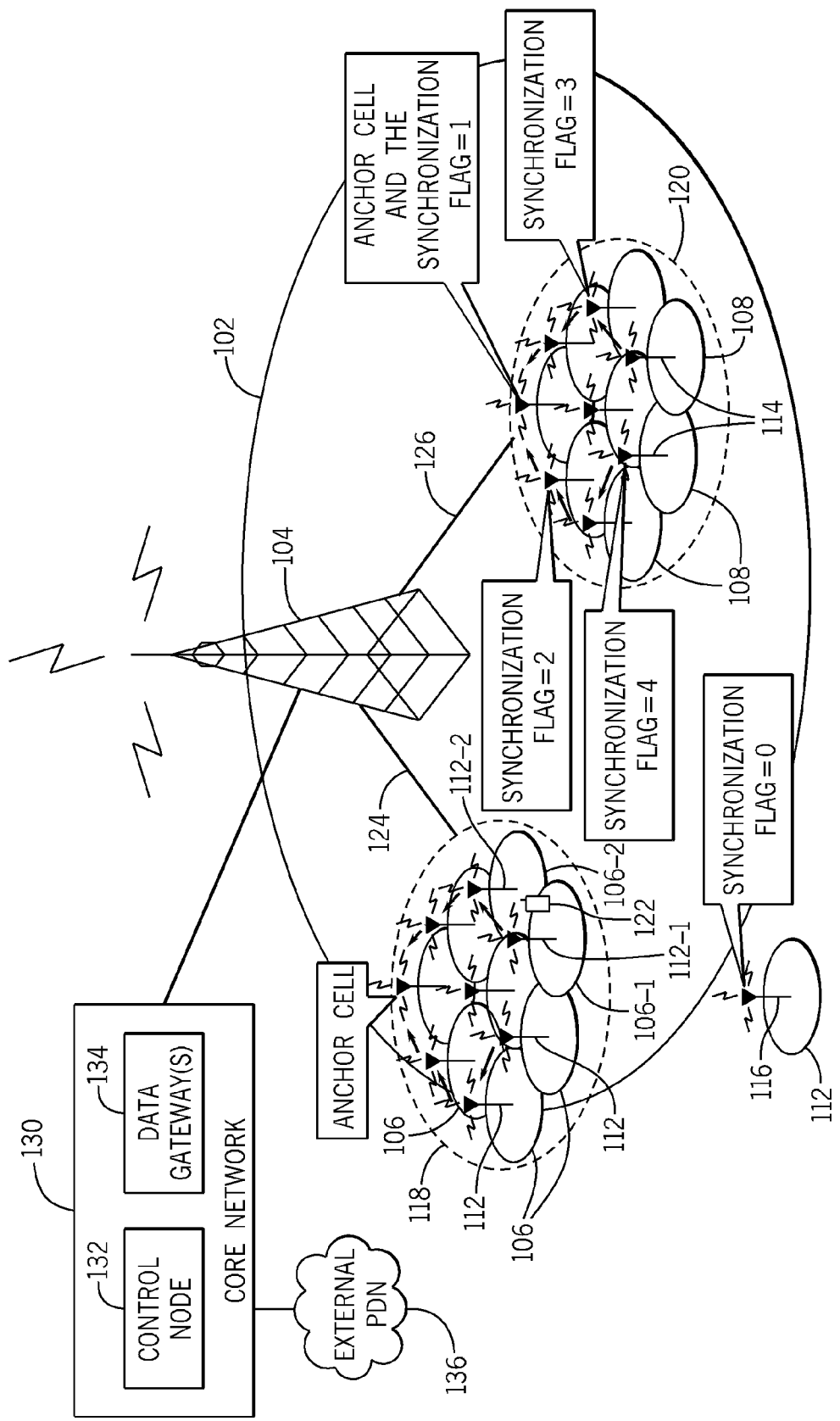
FIG. 1 is a schematic diagram of an example arrangement that includes a macro wireless access network node and small cell wireless access network nodes, in accordance with some implementations.

FIG. 1 is a schematic diagram of an example network arrangement. In the example network arrangement of FIG. 1, a macro cell 102 corresponds to the coverage area provided by a macro wireless access network node 104. In addition, various small cells 106, 108, and 110 are provided. The small cells 106 and 108 are within the coverage area of the macro cell 102. However, the small cell 110 is outside of the coverage area of the macro cell 102.

Each small cell has a corresponding small cell wireless access network node. As depicted in FIG. 1, the small cells 106 have corresponding small cell wireless access network nodes 112, the small cells 108 have corresponding small cell wireless access network nodes 114, and the small cell 110 has a small cell wireless access network node 116.

In the example of FIG. 1, the small cells 106 are part of a cluster 118 of small cells, while the small cells 108 are part of a cluster 120 of small cells. The small cell 110 is not part of any small cell cluster.

FIG. 1 also shows a user equipment (UE) 122 that is within coverage areas of small cells 106-1 and 106-2 in the cluster 118. The small cells 106-1 and 106-2 have corresponding small cell wireless access network nodes 112-1 and 112-2. An example of the UE 122 can include any of the following: a smart phone, a personal digital assistant, a notebook computer, a tablet computer, or any other device that is capable of wireless communications. Although just one UE 122 is depicted in FIG. 1, it is noted that multiple UEs may be present.

Assuming that the UE 122 is a UE that is capable of establishing multiple concurrent connections with multiple respective wireless access network nodes, the UE 122 is able to establish wireless connections with the small cell wireless access network node 112-1 or 112-2, or both, as well as with the macro wireless access network node 104, over respective air interfaces.

In some examples, the connection between the UE 122 and the macro wireless access network node 104 includes a control plane connection. The connection(s) between the UE 122 and the small cell wireless access network node 112-1 and/or 112-2 can include a user plane connection(s) for communicating user plane data. Note also that the connection between the UE 122 and the macro wireless access network node 104 can also be used to communicate user plane data. In some implementations, the connection between the UE 122 and the small cells can also be used to deliver part of the control plane data.

More generally, the UE 122 is capable of being connected to just the macro wireless access network node 104, or to the macro wireless access network node 104 and one or more small cell wireless access network nodes.

A control plane connection is used to communicate control plane data, which can include control messages to perform various control tasks, such as any or some combination of the following: network attachment of a UE, authentication of the UE, setting up radio bearers for the UE, mobility management to manage mobility of the UE (mobility management includes at least determining which infrastructure network nodes will create, maintain or drop uplink and downlink connections carrying control or user plane information as a UE moves about in a geographic area), performance of a handover decision based on neighbor cell measurements sent by the UE, transmission of a paging message to the UE, broadcasting of system information, control of UE measurement reporting, and so forth. Although examples of control tasks and control messages in a control plane are listed above, it is noted that in other examples, other types of control messages and control tasks can be provided. More generally, the control plane can perform call control and connection control functions, and can provide messaging for setting up calls or connections, supervising calls or connections, and releasing calls or connections.

User plane data includes the traffic data (e.g. voice, user data, application data, etc.) to be communicated between the UE and a wireless access network node. User plane data can provide for transfer of bearer data, and can also include control data and/or signals between a wireless access network node and a UE associated with the communication of the bearer data, for performing flow control, error recovery, and so forth.

In some examples, at least some of the small cell wireless access network nodes are also connected over respective backhaul links (e.g. 124, 126) to the macro wireless access network node 104. A backhaul link can be a wired link or a wireless link. A small cell wireless access network node can exchange bearer data and control information with the macro wireless access network node 104 over the respective backhaul link.

The macro wireless access network node 104 has a data distribution module (not shown) that is responsible for distributing downlink data for the UE 122 across multiple connections established with the UE 122. For example, the data distribution module can send downlink data over the connection between the macro wireless access network node 104 and the UE 122, as well as over one or more connections between one or more small cell wireless access network nodes and the UE 122. The data distribution module can also merge uplink data communicated over the multiple connections from the UE 122, for further transmission to a core network 130.

The core network 130 includes a control node 132 and one or more data gateways 134. The data gateway(s) 134 can be coupled to an external packet data network (PDN) 136, such as the Internet, a local area network (LAN), a wide area network (WAN), and so forth.

In some examples, the UE 122 can concurrently connect to one or more small cells for communicating user plane data, as well as concurrently connect to the macro wireless access network node 104 for a control plane connection between the UE 122 and the macro wireless access network node. Note that the concurrent connections that a UE maintains can be logical in that the corresponding physical communication channels may or may not be active at the same time. In one example, the UE is equipped with multiple transceivers. Thus the UE is capable of maintaining multiple physical connections to network nodes (such as macro and small cell wireless access network nodes) simultaneously, where one physical connection is maintained with each network node. In another example, the UE is equipped with one transceiver while it maintains multiple concurrent logical connections to the network nodes. Thus the UE maintains two or more concurrent logical connections by switching the physical connection between the logical connections. The UE is physically connected to one network node at a time, and it switches the physical connections to the network nodes in a time division multiplexing (TDM) manner.

In the ensuing discussion, reference is made to mobile communications networks that operate according to the Long-Term Evolution (LTE) standards as provided by the Third Generation Partnership Project (3GPP). The LTE standards are also referred to as the Evolved Universal Terrestrial Radio Access (E-UTRA) standards.

Although reference is made to E-UTRA in the ensuing discussion, it is noted that techniques or mechanisms according to some implementations can be applied to other wireless access technologies.

In an E-UTRA network, a wireless access network node can be implemented as an enhanced Node B (eNB), which includes functionalities of a base station and base station controller. Thus, in an E-UTRA network, a macro wireless access network node is referred to as a macro eNB, and a small cell wireless access network node can be referred to as a small cell eNB.

In an E-UTRA network, the control node 132 in the core network 130 can be implemented as a mobility management entity (MME). An MME is a control node for performing various control tasks associated with an E-UTRA network. For example, the MME can perform idle mode UE tracking and paging, bearer activation and deactivation, selection of a serving gateway (discussed further below) when the UE initially attaches to the LTE network, handover of the UE between macro eNBs, authentication of a user, generation and allocation of a temporary identity to a UE, and so forth. In other examples, the MME can perform other or alternative tasks.

In an E-UTRA network, the data gateway(s) 134 of the core network 130 can include a serving gateway (SGW) and a packet data network gateway (PDN-GW). The SGW routes and forwards traffic data packets of a UE served by the SGW. The SGW can also act as a mobility anchor for the user plane during handover procedures. The SGW provides connectivity between the UE and the PDN-GW. The PDN-GW is the entry and egress point for data communicated between a UE in the LTE network and a network element coupled to the PDN 136.

Note that there can be multiple PDNs and corresponding PDN-GWs. Moreover, there can be multiple MMEs and SGWs in the network, although for a given UE, the UE is connected to only one MME and one SGW at a time.

Synchronization Using a Synchronization Indication

In accordance with some implementations, synchronization of small cell eNBs is based on synchronization indications transmitted by respective small cell eNBs. A synchronization indication can be in the form of a synchronization flag that can be set to one of multiple possible values to represent respective synchronization states. Alternatively, the synchronization indication can be in the form of a different type of indicator. For example, the indicator can be in the form of a synchronization signal, where different synchronization signals are used to indicate different synchronization states. In further implementations, a synchronization indication can be an implicit synchronization indication rather than an explicit synchronization indication. For example, an implicit synchronization indication can be based on either lack of or presence of certain messages, signals or other information that can be used to imply a certain synchronization state of a small cell.

Figure 2:
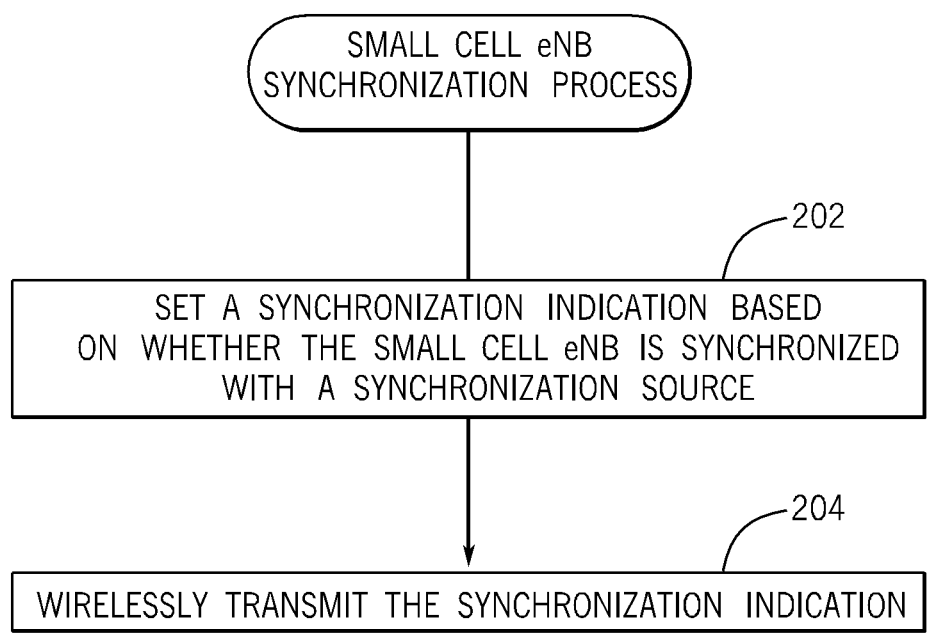
FIGS. 2 and 3 are flow diagrams of synchronization processes according to various implementations.

FIG. 2 is a flow diagram of a synchronization process according to some implementations. A first eNB (which can be a small cell eNB) sets (at 202) a synchronization indication based on whether the first eNB is synchronized with a synchronization source. The synchronization source can be a macro eNB, a Global Positioning System (GPS) receiver, or another small cell eNB. More generally, a synchronization source can refer to any entity to which a wireless access network node is able to synchronize.

The first eNB then wirelessly transmits (at 204) the synchronization indication. The synchronization indication can be detected and is usable by another eNB (e.g. another small cell eNB) when synchronizing to the first eNB.

The first eNB can synchronize with a second eNB (a macro eNB or small cell eNB) using a synchronization signal wirelessly transmitted on the downlink by the second eNB. In some examples, the synchronization signal can include a known synchronization sequence that is transmitted periodically on certain predefined time and frequency resources. Based on the known sequence, the first eNB can determine the subframe and symbol level timing as well as radio frequency used by the second eNB. A subframe refers to a segment of an overall frame that is used for carrying data and control information, where the segment has a specified time length.

In other examples, other types of synchronization signals can be transmitted by eNBs to use for synchronization. It is noted that the synchronization signal that is sent on the downlink is normally used by a UE to synchronize to an eNB. However, to allow for synchronization between the first eNB and the second eNB, the first eNB can behave as a UE to receive the downlink synchronization signal transmitted by the second eNB.

In other examples, instead of synchronizing with the second eNB over the air, the first eNB can synchronize with the second eNB over a backhaul link, such as in examples where the second eNB is a macro eNB and the first eNB is unable to receive downlink signals from the macro eNB. Timing information can be sent over a backhaul link by a macro eNB, and the timing information can be used by the first eNB to synchronize to the macro eNB.

In further examples, the first eNB can synchronize to a GPS (Global Positioning System) receiver if the first eNB is deployed outdoor and is equipped with the GPS receiver. The GPS receiver provides absolute time information, which can be used by the first eNB to perform synchronization with respect to another eNB. Since the absolute time is known, eNBs can use the absolute time to determine the start time of a subframe.

Synchronizing Using a Synchronization Flag

In this section, it is assumed that the synchronization indication that is sent by a small cell eNB is a synchronization flag that can be set to one of multiple possible values to represent respective synchronization states, as noted above.

In some examples, the synchronization flag values can be selected from {0, 1, 2, . . . }. Table 1 below provides an example association of different values of the synchronization flag to respective synchronization states. Although a specific example is shown below, it is noted that in other examples, different values of the synchronization flag can be associated to other synchronization states.

TABLE 1

| Synchronization flag value | Synchronization state |
| --- | --- |
| 0 | Small cell eNB is not synchronized |
| 1 | Small cell eNB is synchronized to a macro eNB or GPS receiver |
| 2 | Small cell eNB is synchronized to another small cell eNB that has a synchronization flag value of "1" |
| 3 | Small cell eNB is synchronized to another small cell eNB that has a synchronization flag value of "2" |
| . . . | . . . |

Generally, the synchronization flag set by a small cell eNB indicates the synchronization state of the small cell eNB. The synchronization flag can indicate whether or not the small cell eNB is synchronized, and if synchronized, whether the small cell eNB is synchronized with a macro eNB or a GPS, or synchronized with another small cell eNB.

According to Table 1 above, a synchronization flag value of "0" indicates that the small cell eNB is not synchronized. A synchronization flag value of "1" indicates that the small cell eNB is synchronized to a macro eNB or a GPS receiver. A synchronization flag value of "2" indicates that the small cell eNB is synchronized to another small cell eNB that has a synchronization flag value of "1". A synchronization flag value of "3" indicates that the small cell eNB is synchronized to another small cell eNB that has a synchronization flag value of "2". More generally, a synchronization flag value of "k" (k>1) indicates that the small cell eNB is synchronized to another small cell eNB having a synchronization flag value of "k-1".

FIG. 1 shows the synchronization flag values of some of the small cell eNBs.

Use of synchronization flag values provided by small cell eNBs can facilitate the formation of a small cell cluster. For example, a first small cell eNB of a cluster can synchronize with the macro eNB (or alternatively to a GPS receiver). This first small cell eNB sets its synchronization flag value to "1", and is referred to as a tier 1 small cell eNB. A tier 1 small cell eNB is also referred to as an anchor small cell eNB. An anchor small cell eNB can perform cluster-related maintenance tasks associated with a cluster of small cells. The anchor small cell eNB can be the small cell eNB that communicates with a macro eNB or other small cell cluster on behalf of the cluster, for purposes of cluster maintenance and formation.

Other small cell eNBs that synchronize with the tier 1 (or anchor) small cell eNB sets their respective synchronization flag values to "2"—a small cell eNB that sets its synchronization flag value to "2" is referred to as a tier 2 small cell eNB. Small cell eNBs that synchronize to a tier 2 small cell eNB set their respective synchronization flag values to "3"—a small cell eNB that sets its synchronization flag value to "3" is referred to as a tier 3 small cell eNB. More generally, a small cell eNB that sets its synchronization flag value to "m" (m>0) is referred to as a tier m small cell eNB.

The synchronization flag can be explicitly broadcast in system information from each small cell eNB. The synchronization flag in the system information can be decoded by another small cell. System information broadcast by an eNB can include configuration information and other information that is useable by a UE to perform cell access.

Figure 3:
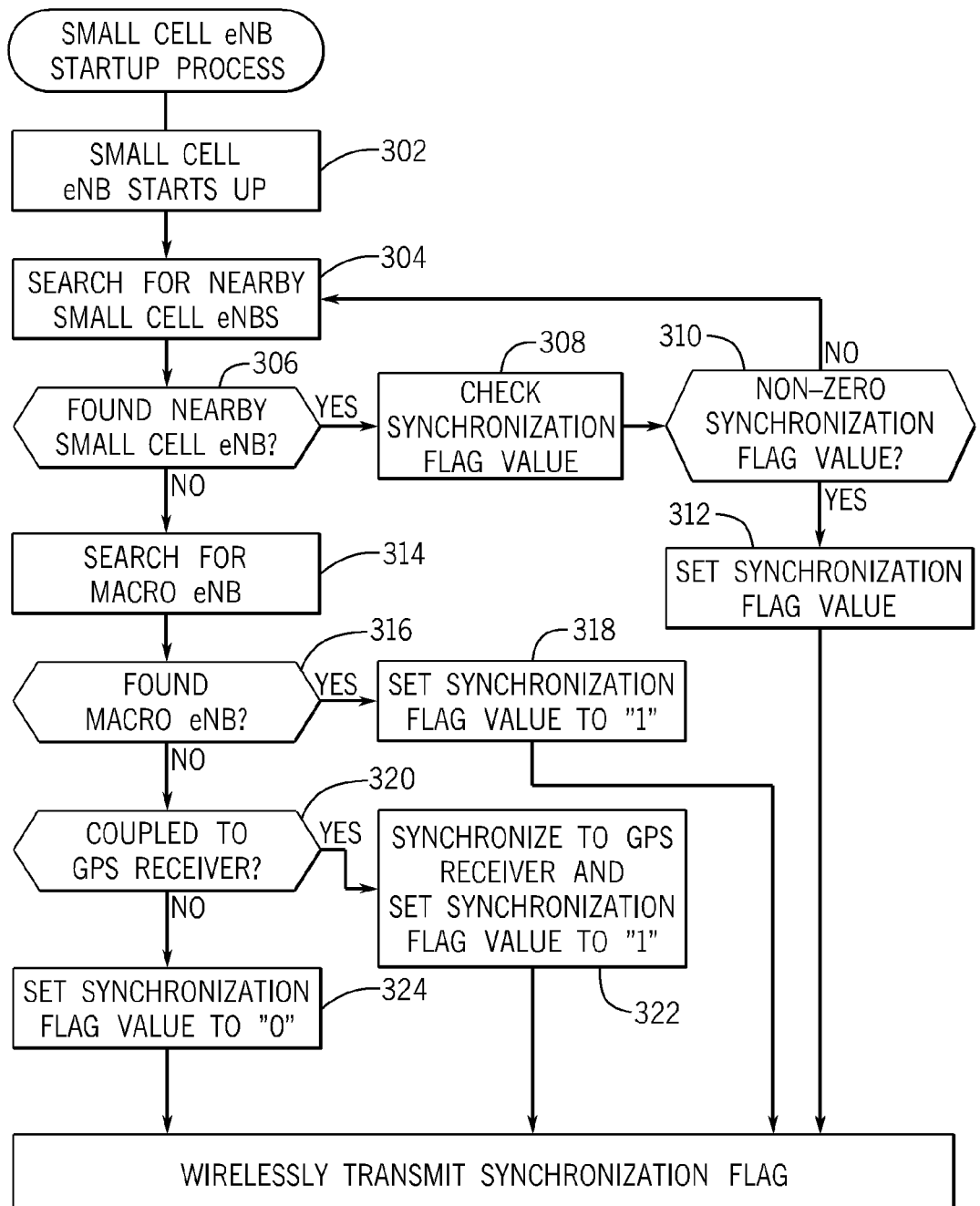

FIG. 3 depicts a startup process of a small cell eNB (herein referred to as a "new" small cell eNB). When the new small cell eNB starts up (at 302) (such as when the small cell eNB initially powers up or initializes due to a reset or dormant mode), the new small cell eNB searches (at 304) for nearby small cell eNBs. Effectively, the new small cell eNB behaves like a UE in trying to search if one or more eNBs are nearby, for the purpose of synchronizing to a nearby eNB, and perhaps further for the purpose of joining or forming a small cell cluster. In searching for a nearby small cell eNB, the new small cell eNB attempts to detect a synchronization signal transmitted by the nearby small cell eNB.

If the new small cell eNB determines (at 306) that it has found a nearby small cell eNB, the new small cell eNB checks (at 308) the synchronization flag value (in system information) sent by the nearby small cell eNB, to determine whether the nearby small cell eNB is synchronized with a synchronization source, such as another small cell eNB, a macro eNB, or a GPS receiver. More specifically, the new small cell eNB determines (at 310) whether the synchronization flag value sent by the nearby small cell eNB is a non-zero value. If not (which means that the synchronization flag value is zero), then that indicates that the nearby small cell eNB is not synchronized, and the new small cell eNB returns to task 304 to search for another nearby small cell eNB. However, if the synchronization flag value transmitted by the nearby small cell eNB is non-zero, then the new small cell eNB sets (at 312) its synchronization flag value based on the synchronization flag value of the nearby small cell eNB to which the new small cell eNB is synchronized. For example, if the synchronization flag value sent by the nearby small eNB as a value j (j>0), then the new small cell eNB sets its synchronization flag value to j+1.

If the new small cell eNB cannot find any nearby small cell eNB whose synchronization flag value is non-zero (as determined at 306), the new small cell eNB attempts to search for and synchronize to a macro eNB or alternatively a GPS receiver. The new small cell eNB searches (at 314) for a macro eNB, such as by detecting a downlink synchronization signal transmitted by the macro eNB. If the new small cell eNB determines (at 316) that it has found a macro eNB, the new small cell eNB sets (at 318) its synchronization flag value to "1", since the new small cell eNB is synchronized with the macro eNB.

However, if the new small cell eNB is unable to find a macro eNB, then the new small cell eNB determines (at 320) whether the new small cell eNB is coupled to a GPS receiver. In some examples, the GPS receiver can be part of the new small cell eNB. Alternatively, the new small cell eNB can be coupled over a link to the GPS receiver.

If the new small cell eNB determines that it has access to a GPS receiver, then the new small cell eNB synchronizes (at 322) using the GPS receiver, and the small cell eNB sets its synchronization flag value to "1".

As noted above, in the case where the new small cell eNB has set its synchronization flag value to "1" (for the case where the new small cell eNB is synchronized to a macro eNB or a GPS receiver), the new small cell eNB is considered an anchor cell eNB.

If the new small cell eNB determines (at 320) that it is not coupled to a GPS receiver, then the new small cell eNB can set (at 324) its synchronization flag value to "0" to indicate that the new small cell eNB is un-synchronized.

The new small cell eNB wirelessly transmits (at 326) its synchronization flag, which can be at any of the values set at 312, 318, 322, or 324. In some implementations, the synchronization flag is included in system information broadcast by the new small cell eNB.

In some other cases, a new small cell eNB may not be able to behave like a UE for purposes of detecting downlink signals transmitted by another eNB (e.g. the new small cell eNB is not equipped with a receiver that is able to tune to the downlink band of another eNB). In such examples, the new cell eNB can synchronize with a macro eNB via a backhaul link or synchronize with a GPS receiver. In this case, the new cell eNB sets its synchronization flag value to "1".

In some other examples, when multiple small cell eNBs are started at the same time, if there is no anchor small cell nearby which is already synchronized with the macro eNB or GPS receiver, then these small cell eNBs may try to synchronize with the macro eNB at the same time, and set their synchronization flag values to "1". Multiple small cell eNBs setting their synchronization flag values to "1" can be considered to be a conflict situation, since only one small cell eNB is allowed to have a synchronization flag value equal to "1" in a given small cell cluster.

In case of such conflict, the macro eNB can resolve the conflict by sending signals to each small cell eNB to adjust their synchronization flag value and to nominate an anchor small cell eNB. Alternatively, the small cell eNBs can negotiate among themselves to elect an anchor small cell eNB. The anchor small cell eNB can set its synchronization flag value to "1". After the anchor small cell eNB is determined, the remaining small cell eNBs can try to synchronize with the anchor small cell eNB and set their synchronization flag values to "2".

The presence of, or lack thereof, of a synchronization flag in system information transmitted by an eNB can be used to distinguish between a small cell eNB or a macro eNB. A macro eNB does not include a synchronization flag in its system information. Upon receipt of system information from a given small cell eNB, a UE or new small cell eNB can attempt to detect the synchronization flag in the system information—if the synchronization flag is detected, then the UE or new small cell eNB can determine that the given eNB is a small cell eNB; otherwise, if the synchronization flag is not detected in the system information, then the UE or new small cell eNB would determine that the given eNB is a macro eNB.

If multiple nearby small cell eNBs are detected by a new small cell eNB, then the selection of one of the nearby small cell eNBs to use as the synchronization source can depend on one or more criteria, such as synchronization flag values or received power strength of signals from the nearby small cell eNBs. For example, if the nearby small cell eNBs have different synchronization flag values, then the new small cell eNB can attempt to synchronize with the nearby small cell eNB having the lowest synchronization flag value. If multiple nearby small cell eNBs have the same synchronization flag value, then the new small cell eNB may randomly select one of the nearby small cell eNBs sharing the common synchronization flag value to synchronize to. Alternatively, the new small cell eNB may select the one nearby small cell eNB from which the new small cell eNB can observe strongest signaling transmission to synchronize to.

Figure 4A:
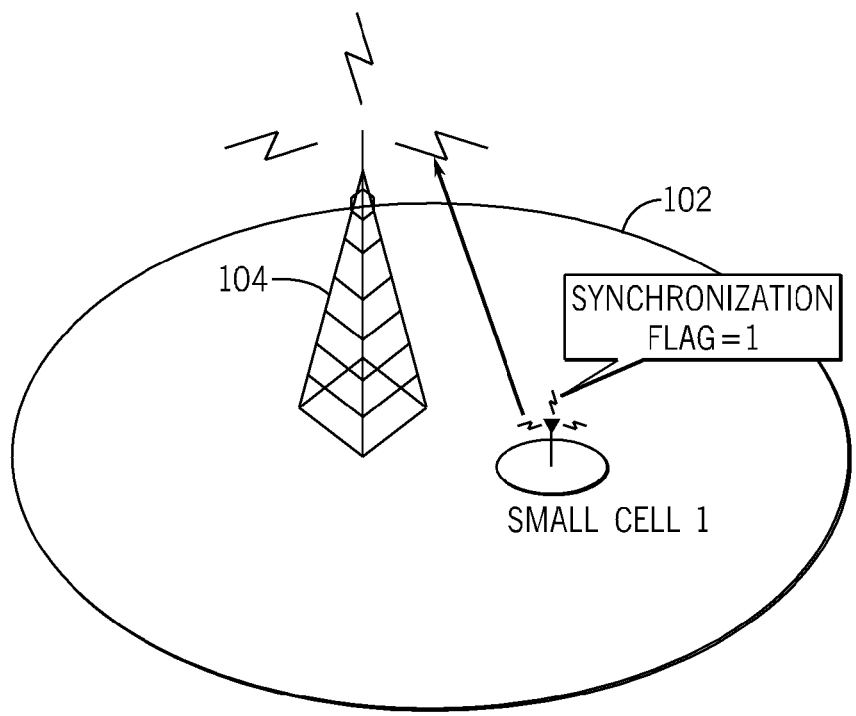
FIGS. 4A-4B and 5 are schematic diagrams of forming clusters, according to various implementations.
Figure 4B:
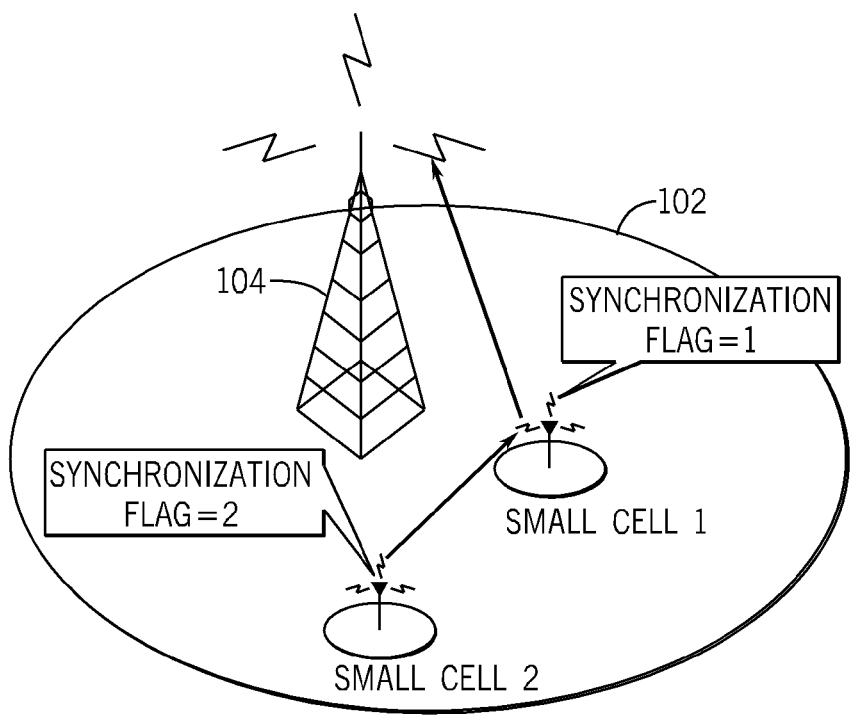

FIG. 4A shows an example in which the eNB of small cell 1 is synchronized with the macro eNB 104. As a result, the eNB of small cell 1 sets its synchronization flag value to "1", as shown in FIG. 4A. Subsequently, small cell 2 starts up, as shown in FIG. 4B. The eNB of small cell 2 detects the synchronization signal of the eNB of nearby small cell 1, and synchronizes to the eNB of small cell 1. As a result, the eNB of small cell 2 sets its synchronization flag value to "2".

More generally, the eNB of small cell 2 sets its synchronization flag value to "j+1" where "j" is the synchronization flag value of small cell 1. The eNB of small cell 2 can then send information to the eNB of small cell 1 via a backhaul link or over the air interface to inform small cell 1 that small cell 2 has joined the cluster. After the initial synchronization process, small cell 2 will try to maintain its synchronization with small cell 1 and may update its synchronization flag if warranted.

Similarly, when other new small cells, which are close to small cell 1, are started, they will follow the same procedure to join the small cell cluster.

By following the above-mentioned procedure, a cluster of small cells with a hierarchical tier structure can be formed, where a synchronization flag value is used as an indication of the tier of a small cell (the tier of the small cell is an indication of its synchronization level).

In some cases, the dynamic nature of small cell deployment may cause some impact on the tier structure of a small cell cluster and the corresponding synchronization flag value of a small cell. For example, when a new small cell eNB is started, the new small cell eNB may observe the transmissions from the small cells in synchronization tiers 1, 2, 3 and 4. In this case, the new small cell eNB synchronizes to the tier 1 small cell eNB and broadcasts a synchronization flag value of 2. After this tier 2 small cell eNB has been added in the cluster, a tier 4 small cell eNB may observe the transmission from this new tier 2 small cell eNB. As a result, the tier 4 small cell eNB may synchronize to the new tier 2 small cell eNB, in which case the tier 4 small cell eNB would change its synchronization flag value from "4" to "3".

In some implementations, a given small cell eNB can report the information of its subscribing small cells to a lower tier small cell eNB. The reported information can include identifiers of small cell eNBs that are synchronized to the given small cell eNB. Assuming that the given small cell eNB is a tier j small cell eNB, the tier j small cell eNB reports, to a tier j−1 small cell eNB, the information of tier j+1 small cell eNB(s) synchronized to the tier j small cell eNB. In addition, each tier j+1 small cell eNB has reported, to the tier j small cell eNB, information of tier j+2 small cell eNB(s) synchronized to the tier j+1 small cell eNB. The tier j small cell eNB forwards such information to the tier j−1 small cell eNB. Ultimately, all such reported information is passed to the anchor small cell eNB, which will have access to information about all small cells that are part of the cluster. In this way, the anchor small cell eNB is able to keep track of members of the small cell cluster.

The foregoing assumes examples where small cells are under the coverage of a macro cell. In other examples, small cells may not be under the coverage of a macro cell.

If a new small cell eNB is out of the coverage area of a macro eNB, then the new small cell eNB would be unable to observe the downlink transmission of the macro eNB. In such a scenario, if the new small cell eNB is unable to first find a nearby small cell eNB with a non-zero synchronization flag value (as performed at 310 in FIG. 3, for example), then the new small cell eNB can determine whether the new small cell eNB is coupled to a GPS receiver (similar to task 320 of FIG. 3). If so, then the new small cell eNB synchronizes using the GPS receiver, and sets its synchronization flag value to "1".

However, if the new small cell eNB is not coupled to a GPS receiver, then the new small cell eNB can attempt to find a nearby small cell eNB with a synchronization flag value of "0". The new small cell eNB can then synchronize with the nearby small cell eNB with the synchronization flag value of "0" to form a small cell cluster. The two small cell eNBs can negotiate with each other to determine who is to act as the anchor small cell eNB. If one of the small cell eNBs has a backhaul link with the macro eNB, then the small cell eNB can synchronize with the macro eNB through the backhaul link, and set its synchronization flag value to "1". Further this small cell eNB can broadcast this synchronization flag value, and other small cell eNBs can update their synchronization flags accordingly.

Figure 5:
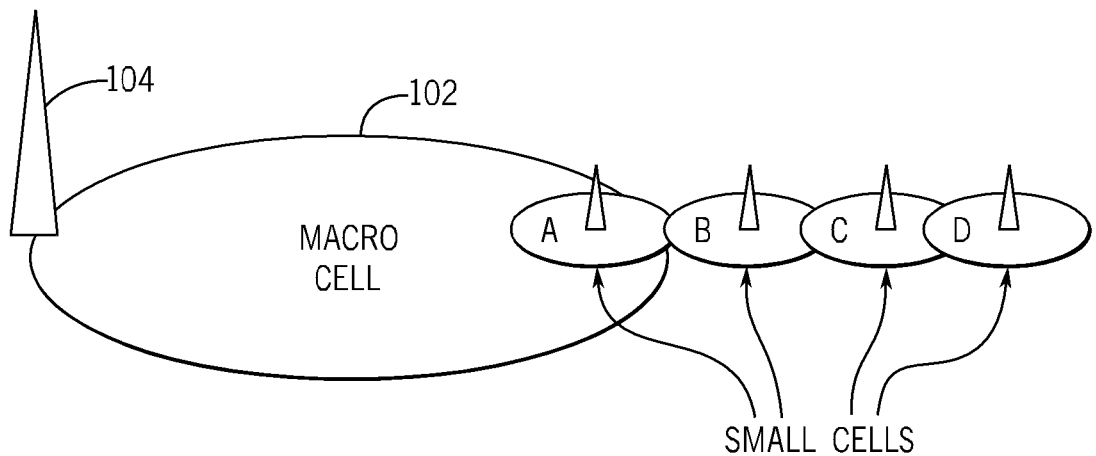

In further examples, small cells can have partial macro cell coverage, in which some small cells may have macro cell coverage while other small cells do not have macro cell coverage. An example is depicted in FIG. 5, in which it is assumed that small cell A is within the coverage area of the macro cell 102; however, the remaining small cells (B, C, D) are outside the coverage area of the macro cell 102.

In this case, the eNB of small cell A within the macro cell coverage can synchronize to the macro eNB 104 over the air interface. After synchronization, the eNB of small cell A can broadcast a synchronization signal and can also set its synchronization flag value as "1". Small cell B does not have the macro cell coverage, so the eNB of small cell B cannot be synchronized to the macro eNB 104. However, the eNB of small cell B can detect the downlink transmission of small cell A and thus synchronize to the eNB of small cell A. The eNB of small cell B can in turn transmit its synchronization signal and set its synchronization flag value as "2". Similarly, the eNB of small cell C can synchronize to the eNB of small cell B, and the eNB of small cell D can synchronize to the eNB of small cell C. As a result, small cells A, B, C and D may achieve synchronization to each other and form a small cell cluster.

Synchronizing Using Synchronization Indicators

The foregoing section refers to use of a synchronization flag for performing synchronization of small cell eNBs. Alternatively, instead of using a synchronization flag that can be set to various different values, another type of synchronization indicator can be employed. For example, different synchronization signals (e.g. synchronization sequences) transmitted by respective small cell eNBs can be used for indicating different synchronization states. In some examples, different synchronization signals are distinguishable from each other due to the use of one or more of different sequences of the corresponding different synchronization signals, different initialization seeds for generating the synchronization sequences, and different time/frequency resources for carrying the different synchronization signals.

The synchronization signals can be synchronization signals defined by current wireless access technology standards, such as 3GPP standards, which may include one or more of primary synchronization signals, secondary synchronization signals, tracking reference signals, and so forth. Alternatively, the synchronization signals for indicating synchronization states of small cell eNBs can be newly defined synchronization signals (e.g. new synchronization sequences) not yet standardized in current standards. Such new synchronization signals can be transmitted at same or different locations in either time or frequency, or both, from standard synchronization signals.

In some examples, three synchronization states can be indicated, including "unsynchronized," "synchronized," and "anchor." The "unsynchronized" state indicates that a small cell eNB is not synchronized with any synchronization source. The "anchor" synchronization state indicates that the small cell eNB is synchronized with a macro eNB or a GPS receiver, or any other synchronization source. The "synchronized" state indicates that the small cell eNB is synchronized with another small cell eNB, including an anchor small cell eNB or a non-anchor small cell eNB.

The "unsynchronized" state is equivalent to the state indicated by the synchronization flag value of "0" discussed above in connection with Table 1. The "anchor" synchronization state is equivalent to the state indicated by the synchronization flag value of "1" in Table 1. The "synchronized" state is equivalent to the state indicated by the synchronization flag value of 2 or greater set forth in Table 1.

Figure 6:
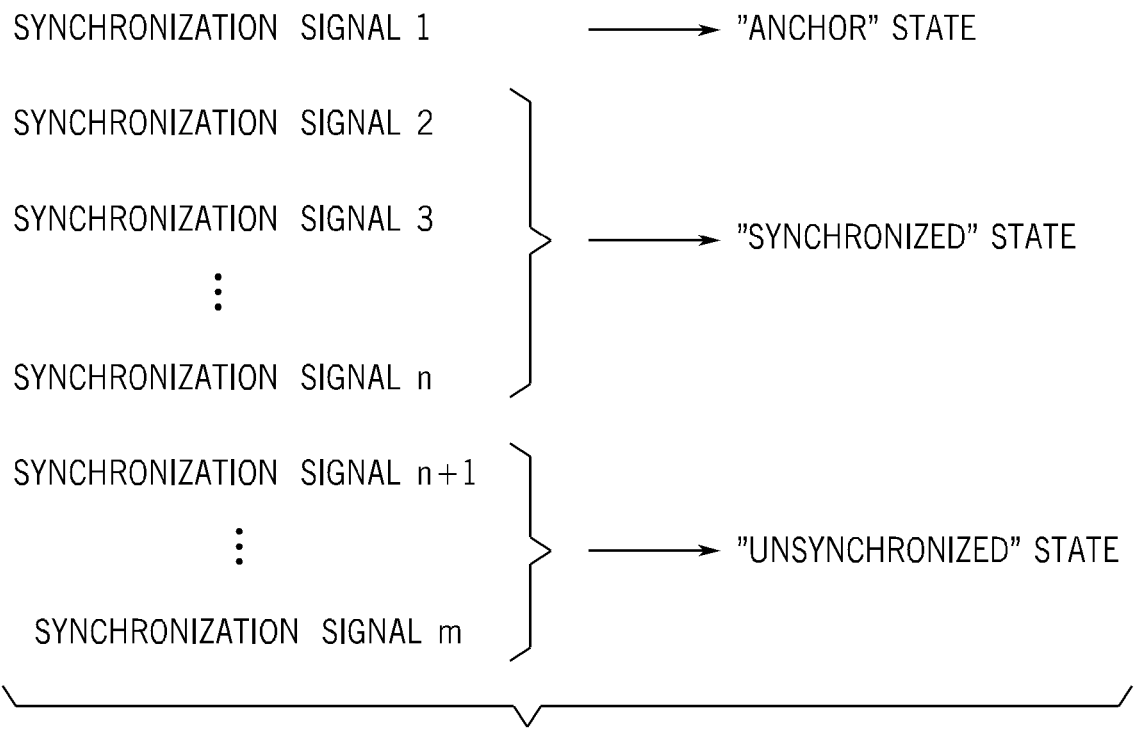
FIG. 6 illustrates an association between synchronization signals and synchronization states, according to some implementations.

If an association can be configured between the synchronization signals and the synchronization states, by detecting synchronization signals, the synchronization states of the small cell eNBs that transmit such synchronization signals can be obtained. FIG. 6 shows an example of an association of various synchronization signals to respective synchronization states. The association information can be provided to each small cell eNB for use in determining the synchronization state indicated by a synchronization signal sent by another small cell eNB detected.

In the FIG. 6 example, synchronization signal 1 is associated with the "anchor" state. In general, only one synchronization signal is allocated for indicating an "anchor" state in a cluster, for identifying the anchor small cell.

Synchronization signals 2 to n can be associated with the "synchronized" state. These synchronization signals can be assigned to small cell eNBs in a cluster which are not the anchor cell.

In addition, synchronization signals n+1 to m can be associated with the "unsynchronized" state. These synchronization signals are assigned to small cell eNBs that are not synchronized to a macro eNB or another small cell eNB.

The association between synchronization signals and respective synchronization states can be predetermined (or dynamically configured) and broadcast to the small cell eNBs. In an example where there is macro cell coverage, the association information can be broadcast by the macro eNB as system information or signaled by the macro eNB to the small cell in a small cell-specific manner. Alternatively, a small cell eNB can access the macro eNB to obtain such association information. Alternatively, this association information can be informed to the small cell eNB by an operations and management (OAM) procedure. Once a small cell eNB obtains the association information, the small cell eNB can try to search for nearby small cell eNBs to synchronize with.

In another example where there is no macro cell coverage, the association information can be broadcast by the first small cell eNB deployed in the area, which may act as an anchor cell eNB at least temporarily, or the association information can be provided using an OAM procedure.

By using a synchronization signal to determine the synchronization state of a given small cell eNB, the synchronization procedure among a number of small cells, and maybe further the formation of a small cell cluster or the joining of a small cell cluster by a new small cell eNB, can be simplified, since small cell eNBs do not have to decode system information to determine if a synchronization flag is included in the system information. A new small cell eNB can simply search for a synchronization signal transmitted by a nearby small cell eNB. Once the synchronization signal of the nearby small cell eNB is detected, the new small cell eNB can use the association information to determine the synchronization state of the nearby small cell eNB. A procedure similar to the procedure of FIG. 3 can be used by a new small cell eNB, but based on synchronization signals rather than synchronization flags for determining synchronization states of small cell eNBs.

In an example, if a new small cell eNB detects multiple nearby small cell eNBs, the new small cell eNB can detect the synchronization signals of the nearby small cell eNBs, and from the synchronization signals, determine the synchronization states of the nearby small cell eNBs. If the new small cell eNB can detect the synchronization signal from an anchor small cell eNB, the new small cell eNB can try to synchronize with the anchor small cell eNB. If the new small cell eNB can only see non-anchor small cell eNBs that have the "synchronized" state, then the new small cell eNB can synchronize with one of the non-anchor small cell eNBs. Once synchronized, the new small cell eNB can transmit its own synchronization signal that is associated with the "synchronized" state.

In general, the synchronization state of a small cell eNB does not change after the synchronization state has been established. However, in some cases, the synchronization state of a small cell eNB can change due to a change at the small cell eNB or a change at another small cell eNB in a cluster. For example, after a first small cell eNB has synchronized with a second small cell eNB, the second small cell eNB may be turned off for some time, which can cause the synchronization state of the first small cell eNB to change. Alternatively, an existing anchor small cell eNB may be replaced by another anchor small cell eNB.

However, as the synchronization state is linked to a synchronization signal, if the change of synchronization state would lead to the change of synchronization signals, such a situation should be handled to minimize the impact on UEs served by a small cell eNB whose synchronization state has changed. For example, if an anchor small cell eNB is deactivated and another small cell eNB is selected as the new anchor small cell eNB, one of the following approaches can be performed. First, the association between an anchor small cell and the corresponding synchronization signal can be updated in the association information. In other words, the association information can be updated to indicate that the synchronization signal used by the new anchor small cell eNB represents the "anchor" state.

Second, the existing synchronization signal used by the old anchor cell eNB is re-allocated for use by the new anchor small cell eNB; this can be performed if activation of the new anchor small cell eNB happens after the old anchor small cell eNB has been deactivated. With the second approach, the association information does not have to be updated.

In alternative implementations, instead of using synchronization signals broadcast by small cell eNBs to indicate respective synchronization states, synchronization information relating to a synchronization state can be transmitted in system information by the respective small cell eNB, similar to the synchronization flag discussed above. However, unlike the synchronization flag, this synchronization information can simply indicate the "anchor" state, "synchronized" state, and "unsynchronized" state, without indicating different levels of the "synchronized" state as done using the synchronization flag.

Indicating just three synchronization states involves use of a fewer number of bits to represent the synchronization information.

Synchronization Between Macro and Small Cells

As discussed above, in forming clusters of small cells, synchronization between an anchor small cell eNB and a macro eNB is performed. In other examples, synchronization between a small cell eNB and a macro eNB can be performed for other reasons, such as to allow a UE to establish concurrent multiple connections between the UE and the macro and small cell eNBs, to perform coordinated multipoint transmissions, to perform carrier aggregation, to perform interference coordination, and so forth.

In some example scenarios, the macro cell eNB and small cell eNB may share a common carrier (of a specified frequency). In such an arrangement, if the common carrier is a legacy carrier (a carrier serving UEs according to LTE Release 11 and earlier releases), the small cell eNB can observe the transmission of a synchronization signal by the macro eNB, and the small cell eNB can employ existing network listening techniques to synchronize to the macro eNB.

In alternative examples, the common carrier of the macro eNB and small cell eNB is a new carrier type (NCT) carrier. A new carrier type refers to a carrier that is of a type different from a legacy carrier, where the new carrier type can be implemented to provide for enhanced features, including enhanced spectral efficiency, improved energy efficiency, improved support for heterogeneous networks, and so forth.

On an NCT carrier, the transmission of a synchronization signal, such as a reference signal, can be reduced—for example, the synchronization signal may be transmitted by the macro eNB in some subframes, but not in other subframes. The small cell eNB can be notified of the subframes that carry the synchronization signal, such as over the backhaul link.

The small cell eNB can listen for different types of reference signals to perform synchronization, such as a cell-specific reference signal (CRS), reduced CRS (also referred to as a tracking reference signal), channel state information reference signal (CSI-RS), primary synchronization signal (PSS), secondary synchronization signal (SSS), and so forth.

In alternative implementations, the macro eNB and small cell eNB can operate on different carriers. In such alternative implementations, if the small cell eNB has a dedicated radio frequency (RF) transceiver to listen to the signal transmission from the macro eNB, the small cell eNB can continuously listen to the signal transmission of the macro eNB.

However, if the small cell eNB does not have a dedicated RF transceiver for listening to the signal transmission of the macro eNB, the small cell eNB can intermittently (e.g. periodically) tune its receiver to listen to the macro eNB's transmission to acquire and maintain synchronization to the macro eNB.

In case a frequency division duplex (FDD) mode is used, during the listening time interval, the small cell eNB would not be able to receive signals from its served UE. In order to avoid packet loss, the small cell eNB can try not to schedule any UE transmission during the listening time period. In the FDD mode, uplink and downlink transmissions are separated in the frequency domain, by transmitting uplink data using a first carrier frequency, and transmitting downlink data using a second carrier frequency.

Alternatively, a time division duplex (TDD) mode can be used. In the TDD mode, both uplink and downlink transmissions occur on the same carrier frequency; however, uplink and downlink transmissions are separated in the time domain, by sending uplink and downlink transmissions in different time periods. If the TDD mode is used, one of several different uplink-downlink configurations may be used. A particular uplink-downlink configuration can specify that, within a frame, a first subset of subframes in the frame is used for uplink transmissions, and a second subset of subframes in the frame is used for downlink transmissions. Different uplink-downlink configurations can employ different numbers of uplink and downlink subframes.

If the macro eNB and the small cell eNB both use the same uplink-downlink configuration, then the subframes within a frame of the macro eNB and small cell eNB would transmit in the same uplink or downlink direction. Even if the macro eNB and small cell eNB were to use different uplink-downlink configurations, at least some of the subframes may communicate in the same (uplink or downlink) direction.

Figure 7:
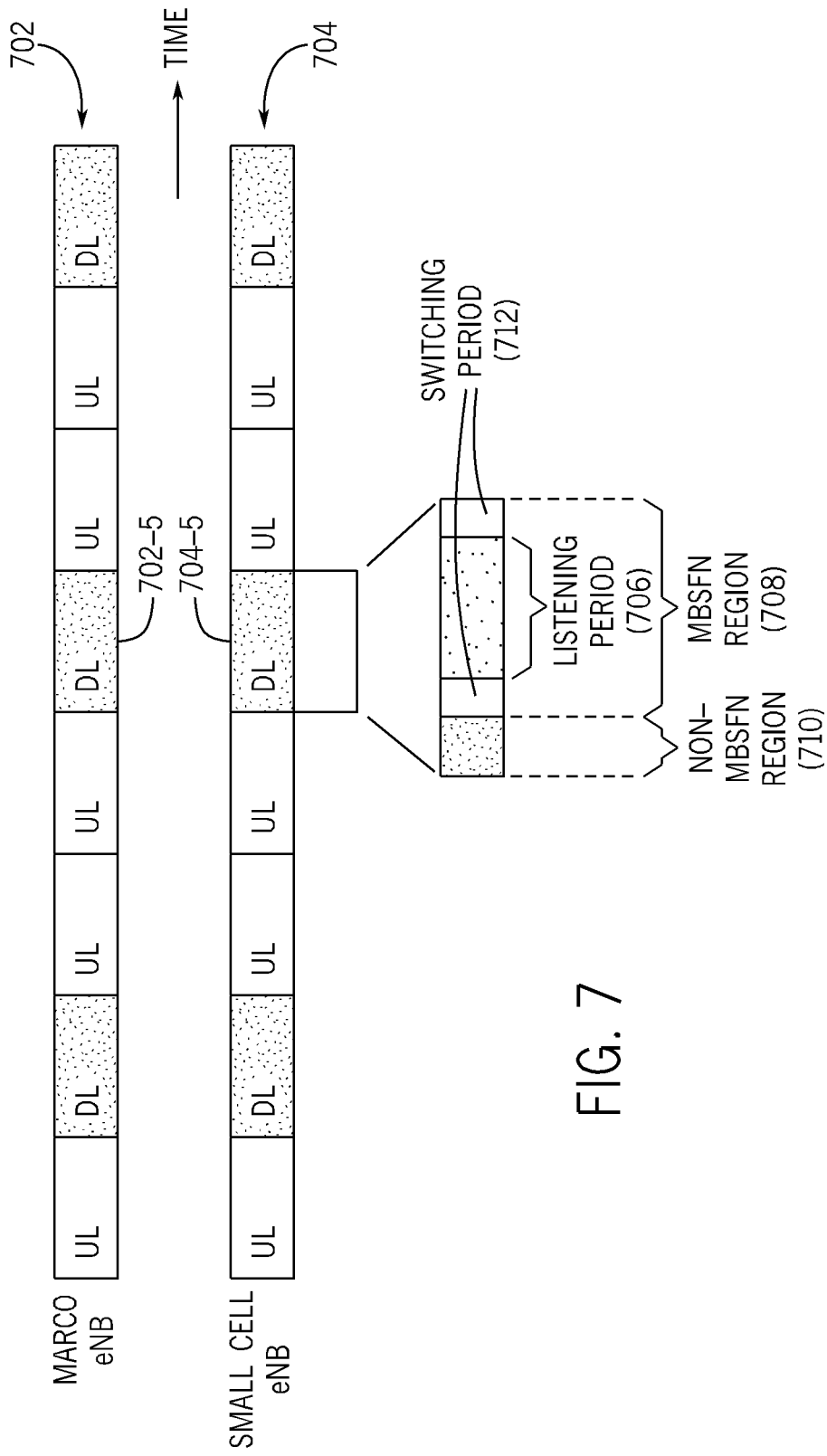
FIG. 7 is a schematic diagram of defining a listening period to listen to downlink signals of a macro wireless access network node, according to some implementations.

FIG. 7 shows an example in which the macro eNB and small cell eNB use the same uplink-downlink configuration, such that each subframe 702 of the macro eNB and the corresponding subframe 704 of the small cell eNB communicate in the same direction. For example, subframe 702-5 and subframe 704-5 both carry downlink data.

The small cell eNB may listen to the macro eNB in some of the downlink subframes for synchronization; however, the small cell eNB cannot transmit to its served UEs while the small cell eNB is listening to the macro eNB. To avoid the impact on the served UEs, the small cell eNB can configure Multimedia Broadcast Multicast Service Single Frame Network (MBSFN) subframes or blank subframes in some subframes where the small cell eNB listens to the macro eNB. The configuration of these MBSFN subframes or blank subframes can be communicated to the served UEs.

As shown in FIG. 7, in the downlink subframe 704-5 of the small cell eNB, a listening period 706 is defined within an MBSFN region 708. The small cell eNB listens for a synchronization signal of the macro eNB during the listening period 706.

The MBSFN region 708 does not occupy the entire subframe 704-5. As a result, the small cell eNB can still transmit a reference signal (e.g. CRS) in a non-MBSFN region 710 of the subframe 704-5. However, the small cell eNB does not schedule any transmission in the MBSFN region 708.

In the MBSFN region 708, the small cell eNB can tune to the downlink frequency of the macro eNB and listen for macro eNB downlink DL signals (e.g. CRS). The small cell eNB can switch back to its serving frequency before the start of the next subframe following subframe 704-5. As depicted in FIG. 7, switching periods 712 in the MBSFN region 708 are provided on either side of the listening period 708.

In alternative examples, if the small cell eNB is not able to listen to the macro eNB's, synchronization information (e.g. synchronization signals) can be relayed by a UE served by the small cell eNB. In such examples, the UE first acquires the synchronization information of the macro eNB using a synchronization procedure, and then, the UE can try to connect to the small cell eNB. The UE can calculate the time gap corresponding to the propagation delay between macro eNB and the UE, and the time gap corresponding to the propagation delay between the small cell eNB and the UE, based on measurements by the UE. The UE can then adjust the timing of the macro eNB's synchronization information based on the determined time gaps, and then the UE can relay the synchronization information to the small cell eNB. The small cell eNB can further adjust its transmission to accommodate the synchronization with the macro eNB. The UE can intermittently (e.g. periodically) relay the synchronization information to the small cell eNB using uplink channels, such as a random access channel (RACH), a physical uplink control channel (PUCCH), or a physical uplink shared channel (PUSCH).

Forming a Small Cell Cluster Based on Measurement

In alternative implementations, a small cell cluster can be formed using measurements of signals transmitted by small cell eNBs. In such implementations, a small cell cluster is formed in a cell-specific manner.

In some implementations, when a new small cell eNB starts up, the new small cell eNB measures downlink signals transmitted by nearby small cell eNBs. Examples of measured downlink signals can include a CRS, CSI-RS, or some other signal transmitted by a small cell eNB. When a strength of the detected downlink signal from a nearby small cell eNB is larger than a specified threshold, the new small cell eNB can identify the nearby small cell eNB as a member of the new small cell eNB's cluster. The new small cell eNB can inform the nearby small cell eNB of the information relating to the cluster. In some implementations, when the small cell eNB is turned on, it may operate first like a UE. The small cell eNB may read the broadcast control channel of the macro eNB and obtain the system configuration and relevant small cell information within the macro cell. Then the small cell eNB can scan for the neighboring small cells via inter-frequency or intra-frequency measurements.

In alternative implementations, signal measurements can be performed by a UE. A given small cell eNB can configure its served UE to measure downlink signals of nearby small cell eNBs. If a strength of a measured signal by the served UE exceed a specified threshold, the UE can report the measurement result as well as the cell identifier of the nearby small cell eNB to the given small cell eNB. Once the given small cell eNB receives the measurement result and cell identifier, the given small cell eNB can identify the nearby small cell eNB as a member of the given small cell eNB's cluster, and can inform the nearby small cell eNB of the information relating to the cluster.

Figure 8:
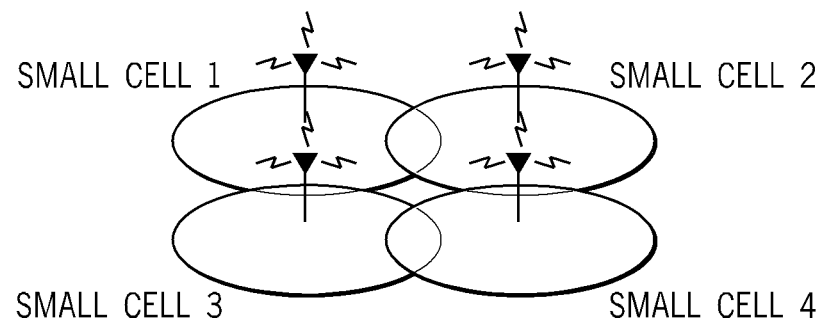
FIG. 8 is a schematic diagram of forming small cell clusters, in accordance with alternative implementations.

FIG. 8 shows an example arrangement that has four small cells (1-4) that partially overlap each other. The eNB of small cell 1 can detect downlink signals of eNBs of small cell 2 and small cell 3. As a result, the eNB of small cell 1 would determine that small cell 1 belongs to a first small cell cluster that also contains small cell 2 and 3. Similarly, the eNB of small cell 2 would determine that it belongs to a second small cell cluster that also contains small cells 1 and 4. Also, the eNB of small cell 3 would determine that it belongs to a third small cell cluster that also contains small cells 1 and 4. Finally, the eNB of small cell 4 would determine that it belongs to a fourth small cell cluster that also contains small cells 2 and 3.

In such examples, each small cell effectively maintains a respective small cell cluster.

Forming a Small Cell Cluster with UE Assistance

When a group of small cells are under the coverage of a macro eNB, the small cell eNBs may all synchronize first to the macro eNB by listening to the downlink signals of the macro eNB. In some scenario, neighboring small cells may have coverage overlap, but they may not be able to clearly detect signals from each other. In this case, the small cell neighbor relationship may be established by the macro eNB through UE feedback.

Figure 9:
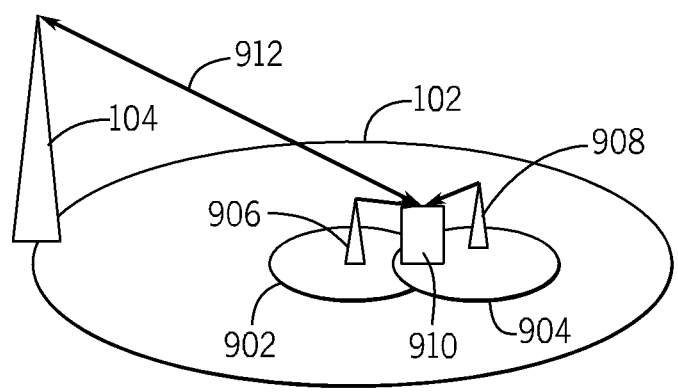
FIG. 9 is a schematic diagram illustrating user equipment-assisted forming of a cluster of small cells, according to some implementations.

An example is shown in FIG. 9, where two small cells 902 and 904 are in the coverage area of a macro cell 102. The eNBs 906 and 908 of the respective small cells 902 and 94 may both synchronize to the macro eNB 104. A UE 910 in the overlap area of the two small cells 902 and 904 may detect signals of both of the small cells 902 and 904, and the UE 910 can report (at 912) feedback regarding the detected signals to the macro eNB 104. For example, the UE 910 can feedback CSI measurements, radio resource management (RRM) measurements, or other measurements for each small cell.

Based on the UE feedback information, the macro eNB 104 can establish the small cell neighbor relationship over time and may inform the neighbor relationships to the small cells. The macro eNB 104 may also determine which small cell belongs to which small cell cluster. In this case, the clustering among small cells in a small cell cluster is controlled and managed by the macro eNB 104. In another alternative, the macro eNB may indicate one small cell to be the cluster head (anchor cell) and other neighboring small cells close to the cluster head to be the cluster members. The cluster head can manage the cluster operation such as turn on/off of small cell eNBs, resource coordination to avoid interference issues, distributed power control, and other tasks.

Alternatively, uplink signals from the UE 910 can be used to form a small cell cluster. For example, the sounding reference signal (SRS), random access channel (RACH) signals, or other uplink signals transmitted by the UE 910 can be received by a small cell eNB and the small cell eNB can pass the uplink signal measurements to the macro eNB 104. The macro eNB 104 can then determine the proximity of the small cell eNB based on the uplink signal measurements, and can assign the small cell eNB to a small cell cluster. Alternatively, the macro eNB can form a small cell cluster based on geo-location information even though the information may not be accurate. The macro eNB can also combine all the relevant information to determine the clustering.

Operator Configuring of Small Cell Cluster

In some implementations, a network operator can deploy a group of small cells in certain geographic area, such as a shopping mall, a corporate campus, a school, and so forth. In this group deployment, a small cell eNB can be designated as an anchor small cell of a cluster, either by pre-configuration or by an operations and management (OAM) procedure. Other small cell eNBs can be added as cluster members of the cluster. When a new small cell eNB is deployed, the network operator can configure the new small cell eNB as belonging to the cluster, and the new small cell eNB can register with the anchor small cell of the cluster.

Each anchor small cell has the overall cluster member information and can provide some control over the member small cell eNBs of the cluster. In this way, some control functions can be moved from the macro eNB to the anchor small cell eNB, such as the turning on/off the small cells, distributed power control, interference coordination, and other tasks. When members of the cluster change (such as when a member small cell eNB is removed), the anchor small cell eNB can update its cluster information with the macro eNB or another network node.

Alternatively, the anchor small cell eNB can coordinate an interference control scheme in a dense cluster deployment. For example, in a cluster in which multiple carriers are used, the anchor small cell eNB can allocate the carriers used by each of the member small cell eNBs. Also, the anchor small cell eNB can adjust the carrier allocation from time to time. If a member small cell eNB is overloaded, more carriers may be allocated to the overloaded small cell eNB by the anchor small cell eNB. To enable the foregoing, the member small cell eNBs can report their traffic status and load condition to the anchor small cell eNB.

In further examples, member small cell eNBs can also report interference conditions to the anchor small cell eNB. The anchor small cell eNB can operate as a local interference controller for the cluster.

If there are a large number of small cells in a macro cell, such as hundreds of small cells, it can be difficult for the macro eNB to perform all coordination functions. As a result, it may be more efficient for the anchor small cell eNB to perform some coordination tasks, such as interference control.

In alternative examples, the anchor small cell eNB can coordinate operation of the member small cell eNBs for optimized use of the power. For example, during a time when the traffic load is low, the anchor small cell eNB can deactivate or turn off some of the small cell eNBs and enlarge the coverage areas of the remaining small cell eNBs while maintaining the same overall coverage. In this way, overall system capacity is reduced to conserve power.

During a time when the traffic load is high, the anchor small cell eNB can activate or turn on all the member small cell eNBs. For example, when the traffic in certain areas in a big shopping mall is highly loaded, the anchor small cell eNB can move most of the radio resources to the highly loaded area and turn on all the relevant small cell eNBs. In other areas of the shopping mall, a power saving mode can be used by deactivating or turning off some member small cell eNBs. Traffic load can be indicated by periodically reporting traffic conditions and interference conditions.

Some overlapping between coverage areas of different small cell clusters are possible. Each small cell eNB, either an anchor small cell eNB or member small cell eNB, can communicate with the macro eNB either via a wireless backhaul link or wired backhaul link. The mobility function can be provided in the macro eNB, while some radio resource functions can be delegated to the anchor small cell eNB, as described above.

In some examples, a cluster can operate as a closed subscriber cluster (CSC), which means that only UEs subscribed to this cluster can connect to any of its member small cell eNB or anchor small cell eNB. UEs not belonging to this cluster cannot access the small cell cluster. For example, a UE that has not subscribed in a company campus small cell cluster cannot access any of the small cells on the company campus.

For more effective operation, an anchor small cell eNB remains powered on while other member small cell eNBs can be dynamically turned on or off based on traffic conditions. If some member cell eNBs are unexpectedly turned off, the anchor small cell eNB is able to allocate more resources to the neighboring small cell eNBs to accommodate disconnected UEs.

The anchor small cell eNB can also perform some admission control functions and load control functions for the cluster. This can be done using the X2 interface (or other new interface) between the anchor small cell eNB and the member small cell eNBs of the cluster.

Self-Configuring of Small Cell Cluster

In alternative implementations, small cells are not in the coverage of a macro cell, or small cells are deployed in a user-deployed manner. The selection of an anchor small cell eNB for a cluster can be completed through negotiation among small cell eNBs. Not all small cell eNBs may be capable of being an anchor small cell eNB. In some examples, a criterion to select a small cell eNB as an anchor small cell eNB is based on the capability of the small cell eNB. If a number of small cell eNBs are all capable to be an anchor small cell eNB, the selection of the anchor small cell eNB can be based on one or more of the following factors: which small cell eNB is first powered on in the network, which small cell eNB has a better backhaul connection, which small cell eNB has better coverage, and so forth. The anchor small cell eNB in a cluster can be changed from one small cell to another. In some implementations, a unique value may be associated with the small cell when manufactured. The small cell with larger value will be the anchor small cell. The operators may change this value.

Managing a Small Cell Cluster

If a small cell is user deployed, there is a possibility that member of the small cell cluster can vary over time since some small cell eNBs may be removed or turned off and some other small cell eNBs may be added or turned on.

If a small cell eNB leaves a cluster, the anchor small cell eNB should be notified of this. Each small cell eNB can periodically transmit a flag indicating that the small cell eNB is in an active mode to an upper layer via a backhaul link—if the anchor small cell eNB does not receive this flag from a particular small cell eNB, then the anchor small cell eNB can determine that the particular small cell eNB has left the cluster.

Once a member small cell eNB other than an anchor cell eNB is deactivated, other small cell eNBs synchronized to the deactivated small cell eNB has to find new synchronization source. If a synchronization flag as discussed above is used, a given small cell eNB that loses its synchronization source can try to synchronize to a synchronization source that has a lowest synchronization flag value. In some cases, if more than one small cell eNB have the same lowest synchronization flag value, the small cell eNB that has the strongest received signal can be chosen as the new synchronization source, and the given small cell eNB can update its synchronization flag accordingly.

To avoid the impact on served UEs, a given small cell eNB that loses its synchronization source can try to acquire a new synchronization source. After a synchronization is achieved, the given small cell eNB can adjust the tier value in the updated system information as well as the timing information to the served UE without releasing the served UEs.

If an anchor small cell eNB is deactivated, the remaining member small cell eNBs of the cluster will determine whether they are equipped with a GPS receiver or if they can observe a macro eNB. If either is true, such a small cell eNB can become the new anchor small cell eNB, and its synchronization flag can be updated accordingly. To avoid the collision problem, the subframe for each small cell eNB to update its respective synchronization flag can be different, which is configurable. For example, after the anchor small cell eNB is deactivated, several other small cell eNBs within the small cell cluster are each equipped with a GPS receiver or can observe the transmission from a macro eNB. In one alternative, to avoid introducing a large change to the small cell cluster, the small cell eNBs with the lowest tier will first try to acquire the synchronization. If no reliable synchronization source is found, then the small cell eNBs that have a second lowest tier can try to acquire the synchronization until a reliable synchronization source is found. The remaining small cell eNBs can update their synchronization flags accordingly. To achieve the foregoing, the subframe location for updating synchronization flags can be carefully designed for the small cell eNBs of different tiers. In another alternative, the small cell eNBs can coordinate to elect an anchor cell via backhaul linkage.

Once an anchor small cell eNB is deactivated and all the remaining small cell eNBs cannot observe the macro eNB and they are not equipped with a GPS receiver, the remaining small cell eNBs can try to find whether they can synchronize to a small cell eNB in another small cell cluster, and their synchronization flags can be updated accordingly.

A small cell eNB that loses its synchronization source can update its synchronization flag value to "0".

System Architecture

Figure 10:
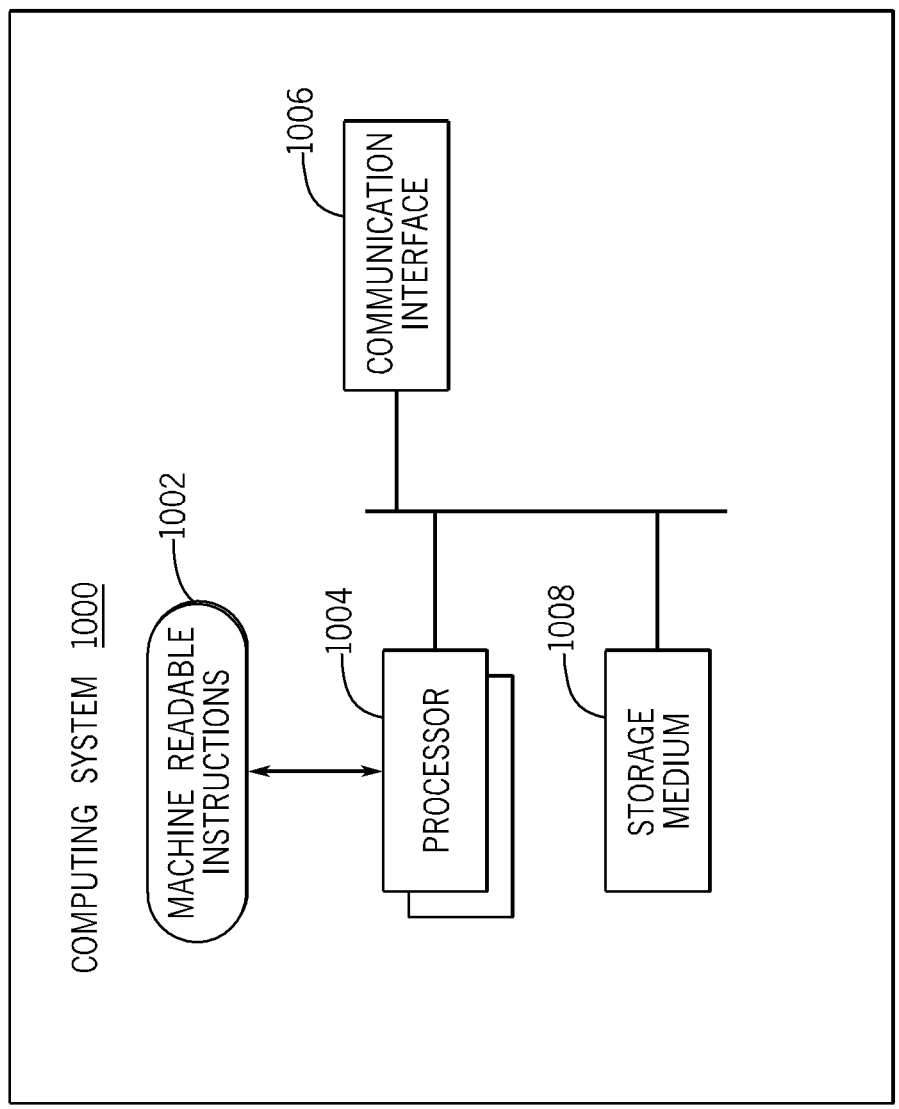
FIG. 10 is a block diagram of a computing system according to some implementations.

FIG. 10 depicts a computing system 1000, which can be any of a UE, a macro eNB, or a small cell eNB. The computing system 1000 includes machine-readable instructions 1002, which are executable on a processor (or multiple processors) 1004 to perform various tasks discussed above. A processor can include a microprocessor, microcontroller, processor module or subsystem, programmable integrated circuit, programmable gate array, or another control or computing device.

The processor(s) 1004 can be coupled to a communication interface or component 1006 to perform communications. For example, the communication component 1006 can perform wireless communicate over an air interface, or perform wired communication over a wired connection. In some cases, the computing system 1000 can include multiple communication components 1006 to communicate with respective different network nodes.

The processor(s) 1004 can also be coupled to a computer-readable or machine-readable storage medium (or storage media) 1008, for storing data and instructions. The storage medium or storage media 1008 can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
    attempting, by a first small cell wireless access network node, to synchronize with a second small cell wireless access network node that is synchronized to a synchronization source;
    in response to the first small cell wireless access network node being able to synchronize with the second small cell wireless access network node that is synchronized to the synchronization source, setting, by the first small cell wireless access network node, a first synchronization indication based on a second synchronization indication received by the first small cell wireless access network node from the second small cell wireless access network node;
    in response to the first small cell wireless access network node being unable to synchronize with the second small cell wireless access network node that is synchronized with the synchronization source, the first small cell wireless access network node:
        determining whether the first small cell wireless access network node is able to synchronize with a macro cell or a global positioning system (GPS) receiver, and
        in response to determining that the first small cell wireless access network node is able to synchronize with the macro cell or the GPS receiver, setting a third synchronization indication different from the second synchronization indication, and responsive to detecting a conflict condition in which the first small cell wireless access network node and at least another small cell wireless access network node have set the third synchronization indication, performing an operation to resolve the conflict condition to change the third synchronization indication of one of the first small cell wireless access network node and the at least another small cell wireless access network node to a different synchronization indication.

2. The method of claim 1, wherein the first synchronization indication is an explicit indication or an implicit indication.

3. The method of claim 1, further comprising:
    joining, by the first small cell wireless access network node, a cluster of small cell wireless access network nodes including the second small cell wireless access network node.

4. The method of claim 1, wherein setting the first synchronization indication comprises setting synchronization information to one of a plurality of values, a first of the values indicating that the first small cell wireless access network node is un-synchronized with any synchronization source, a second of the values indicating that the first small cell wireless access network node is synchronized with the macro cell or the GPS receiver, and a third of the values indicating that the first small cell wireless access network node is synchronized with a small cell.

5. The method of claim 4, wherein the third value indicates that the first small cell wireless access network node is synchronized with the second small cell wireless access network node that has synchronization information set to the second value, and the plurality of values further include a fourth value indicating that the first small cell wireless access network node is synchronized to a small cell that has synchronization information set to the third value.

6. The method of claim 5, wherein the first small cell wireless access network node is part of a cluster that has cells in a plurality of tiers indicated by different values of synchronization information of corresponding small cell wireless access network nodes that are part of the cells in the cluster.

7. The method of claim 1, wherein transmitting the first synchronization indication comprises transmitting the first synchronization indication in system information broadcast wirelessly by the first small cell wireless access network node.

8. The method of claim 1, further comprising:
    in response to the second synchronization indication received from the second small cell wireless access network node having a first value, joining, by the first small cell wireless access network node, a cluster of cells that includes the second small cell wireless access network node.

9. The method of claim 1, further comprising:
    reporting, by the first small cell wireless access network node to another small cell wireless access network node, information regarding cells synchronized to the first small cell wireless access network node.

10. The method of claim 1, further comprising:
in response to the first small cell wireless access network node being unable to synchronize with the macro cell or the GPS receiver, the first small cell wireless access network node:
  detecting a third small cell wireless access network node associated with synchronization information set to a value indicating that the third small cell wireless access network node is un-synchronized, and
  cooperating with the third small cell wireless access network node to determine which of the first and third small cell wireless access network nodes is to be an anchor node for a cluster of cells.

11. The method of claim 1, wherein transmitting the first synchronization indication comprises transmitting one of a plurality of different synchronization signals for indicating corresponding different synchronization states.

12. The method of claim 11, wherein an association is configured between the synchronization signals and the different synchronization states.

13. The method of claim 11, wherein the synchronization signals include one or more of primary synchronization signals, secondary synchronization signals, and tracking reference signals.

14. The method of claim 11, wherein the different synchronization signals are distinguishable from each other due to one or more of different sequences of the corresponding different synchronization signals, and different resources for carrying the different synchronization signals.

15. The method of claim 11, further comprising:
in response to a synchronization state of the first small cell wireless access network node changing, associating the first small cell wireless access network node with another synchronization signal or changing an association between synchronization signals and corresponding synchronization states.

16. The method of claim 1, further comprising:
detecting, by the first small cell wireless access network node, deactivation of the second small cell wireless access network node of a cell in a cluster of cells, wherein the first small cell wireless access network node was synchronized to the second small cell wireless access network node prior to deactivation of the second small cell wireless access network node; and
in response to the detected deactivation of the second small cell wireless access network node, synchronizing, by the first small cell wireless access network node, with a third small cell wireless access network node of a cell in the cluster of cells.

17. The method of claim 1, further comprising:
detecting, by the first small cell wireless access network node, deactivation of an anchor node of a cluster of cells;
in response to the detected deactivation of the anchor node, determining that the first small cell wireless access network node is able to synchronize with the macro cell or the GPS receiver; and
in response to determining that the first small cell wireless access network node is able to synchronize with the macro cell or the GPS receiver, updating the first synchronization indication to indicate that the first wireless access network node is an anchor node of the cluster.

18. The method of claim 1, further comprising:
detecting, by the first small cell wireless access network node, a reference signal of the macro cell; and
synchronizing, by the first small cell wireless access network node, with the macro cell using the reference signal.

19. The method of claim 18, further comprising:
receiving, by the first small cell wireless access network node, information relating to a location of the reference signal.

20. The method of claim 1, further comprising:
detecting, by the first small cell wireless access network node, synchronization information of the macro cell as relayed by a user equipment; and
synchronizing, by the first small cell wireless access network node, with the macro cell using the synchronization information relayed by the user equipment.

21. A first wireless access network node comprising:
a communication component; and
at least one processor configured to:
  detect a first synchronization indication transmitted by a second wireless access network node to which the first wireless access network node is synchronized;
  set a second synchronization indication based on the first synchronization indication; and
  wirelessly transmit the second synchronization indication;
  detect a conflict condition in which a third wireless access network node also has set the second synchronization indication; and
  in response to detecting the conflict condition, update the second synchronization indication to a different synchronization indication.

22. The method of claim 1, further comprising:
in response to the first small cell wireless access network node being able to synchronize with the macro cell or the GPS receiver:
  transmitting, by the small cell wireless access network node, the third synchronization indication.

23. The method of claim 22,
wherein detecting the conflict condition is responsive to a signal for adjusting a synchronization indication of the first small cell wireless access network node.

24. A first small cell wireless access network node comprising:
a communication interface; and
at least one processor configured to:
  attempt to synchronize with a second small cell wireless access network node that is synchronized to a synchronization source;
  in response to the first small cell wireless access network node being able to synchronize with the second small cell wireless access network node that is synchronized to the synchronization source:
    set a first synchronization indication based on a second synchronization indication received by the first small cell wireless access network node from the second small cell wireless access network node; and
    wirelessly transmit the first synchronization indication; and
  in response to the first small cell wireless access network node being unable to synchronize with the second small cell wireless access network node that is synchronized with the synchronization source, determine whether the first small cell wireless access network node is able to synchronize with a macro cell or a global positioning system (GPS) receiver, and in response to determining that the first small cell wireless access network node is able to synchronize with the macro cell or the GPS receiver:
set a third synchronization indication different from the second synchronization indication, and
responsive to detecting a conflict condition in which the first small cell wireless access network node and at least another small cell wireless access network node have set the third synchronization indication, perform an operation to resolve the conflict condition to change the third synchronization indication of one of the first small cell wireless access network node and the at least another small cell wireless access network node to a different synchronization indication.

25. The first small cell wireless access network node of claim 24, wherein the first synchronization indication is a first value, the second synchronization indication is a second value different from the first value, and the third synchronization indication is a third value different from each of the first and second values.

26. The first small cell wireless access network node of claim 24, wherein the first synchronization indication is a first synchronization signal, the second synchronization indication is a second synchronization signal different from the first synchronization signal, and the third synchronization indication is a third synchronization signal different from each of the first and second synchronization signals.

27. The first small cell wireless access network node of claim 24, wherein the at least one processor is configured to:
in response to the first small cell wireless access network node being able to synchronize with the macro cell or the GPS receiver:
transmit the third synchronization indication.

28. A non-transitory storage medium storing instructions that upon execution cause a first small cell wireless access network node to:
attempt to synchronize with a second small cell wireless access network node that is synchronized to a synchronization source;
in response to the first small cell wireless access network node being able to synchronize with the second small cell wireless access network node that is synchronized to the synchronization source:
set a first synchronization indication based on a second synchronization indication received by the first small cell wireless access network node from the second small cell wireless access network node; and
transmit the first synchronization indication; and
in response to the first small cell wireless access network node being unable to synchronize with the second small cell wireless access network node that is synchronized with the synchronization source, determine whether the first small cell wireless access network node is able to synchronize with a macro cell or a global positioning system (GPS) receiver, and in response to determining that the first small cell wireless access network node is able to synchronize with the macro cell or the GPS receiver:
set a third synchronization indication different from the second synchronization indication, and
responsive to detecting a conflict condition in which the first small cell wireless access network node and at least another small cell wireless access network node have set the third synchronization indication, perform an operation to resolve the conflict condition to change the third synchronization indication of one of the first small cell wireless access network node and the at least another small cell wireless access network node to a different synchronization indication.

\* \* \* \* \*